May 15, 1962    J. H. JAWOROWICZ    3,034,330
UNBALANCE SIMULATOR
Filed July 26, 1960
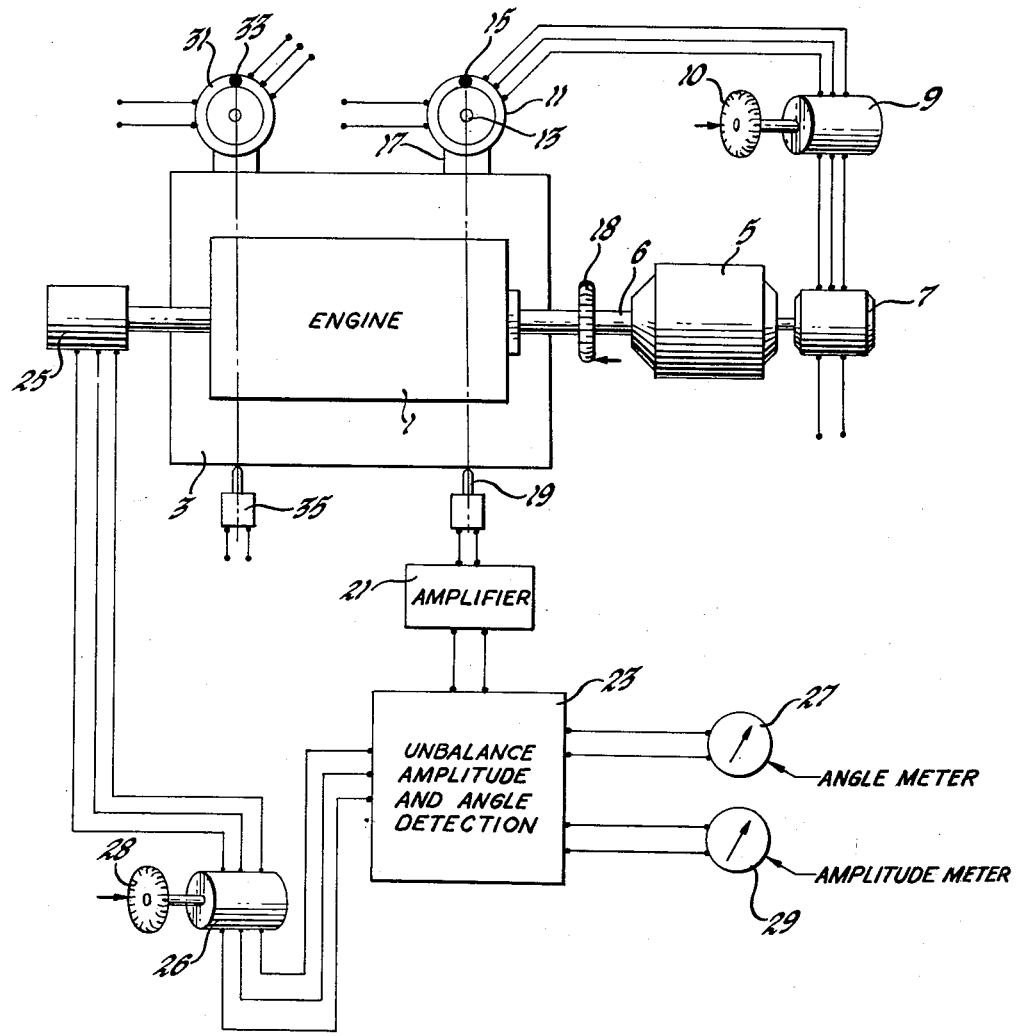
INVENTOR.
John H. Jaworowicz
BY
Robert B. Gerhardt
ATTORNEY

United States Patent Office 3,034,330
Patented May 15, 1962

3,034,330
UNBALANCE SIMULATOR
John H. Jaworowicz, Detroit, Mich., assignor to General Motors Corporation, Detroit, Mich., a corporation of Delaware
Filed July 26, 1960, Ser. No. 45,417
7 Claims. (Cl. 73—1)

This invention relates to balancing apparatus and more particularly to unbalance simulation means for calibrating unbalance measuring apparatus.

In order to measure static or dynamic unbalance in a workpiece, the workpiece is generally rotated and the phase and amplitude of vibrations caused by unbalance in the workpiece are measured. The apparatus for determining this phase and amplitude usually includes electronic components that are subject to slow drifting of voltages. Therefore to calibrate and maintain the unbalance measuring and indicating device a simulated unbalance force must be applied either to the actual workpiece or cradle assembly supporting the workpiece.

Where rotating members are being balanced to very low vibration tolerances, the signal to noise ratio received by a vibration pickup is so low that conventional unbalance measuring systems cannot detect the correct amount and angle of unbalance due to the high noise level. By mechanically adding a known unbalance, such as an accurately weighted mass known as a check weight, to the part being balanced at a given radius and at a different angle on each of from four to twelve runs, the pickup output vibration signal can be made sufficiently larger than the noise.

The measuring system can then determine the correct angle and amount of unbalance. For example, if the amount readings indicated by the measuring system indicate the same amount of unbalance no matter where the known unbalance is located on the workpiece, then the part is in balance. If there is a difference in amplitude at different locations of the known unbalance, then one-half of the difference between the maximum and minimum amplitude will be the actual amount of unbalance in the workpiece. Also the maximum amount position of the known added unbalance will indicate the position of actual unbalance while the minimum position will indicate a point on the workpiece opposite the unbalance.

By making a polar graph utilizing the amount readings at different locations of added unbalance, the exact amount and location of actual unbalance can be determined. Where very accurate measurements are required, the workpiece may have to be stopped, the added known weight moved, and the workpiece rotated as many as twelve times. In some cases two weights having a given difference in weight spaced 180 degrees apart must be used to render the check weight of convenient size.

The check weight method for calibration or precision balancing outlined above is tedious and time consuming. Also it is not always convenient or possible to find a location for a check weight in the connection plane due to the shape or geometry of the part being balanced.

It therefore is an object of this invention to provide an unbalance simulating method whereby a known unbalance force can be applied to the workpiece or its support at various angles with respect to a fixed point on the workpiece without actually moving the force applying device.

A further object of the invention is to provide an unbalance simulator which does not have to physically contact the workpiece and yet simulates actual unbalance in such workpiece.

Still another object is to provide an unbalance simulator for calibrating unbalance measuring apparatus wherein unbalance forces can be simulated at any angle on a workpiece.

These and other objects and advantages will be readily apparent from the following description and drawing.

Referring to the FIGURE in which an apparatus for determining unbalance in an engine is diagrammatically shown, 1 represents an engine assembly with the rotating parts, primarily the crankshaft, being the workpiece or rotor to be checked. A cradle 3 supports the engine 1 and is in turn flexibly or resiliently mounted so that the cradle partakes in vibrations caused by unbalance in the rotating parts. It is understood that the crankshaft itself or other rotors whose unbalance is to be measured could be mounted directly on the cradle if the crankshaft itself is to be balanced.

A drive motor 5 is connected by a shaft 6 to the engine to drive the same. A selsyn generator 7 is also driven by the drive motor 5. The selsyn generator 7 which may be of any suitable type such as type 1HG has its electrical output connected to a selsyn differential generator which again may be of any suitable type such as type 1DG. The differential generator is electrically connected to a suitable selsyn motor 11 having its stator 17 attached in any suitable manner to the cradle 3.

Eccentrically mounted on the rotor 13 of the selsyn motor 11 is a calibrated check weight 15 located at a fixed radius from the center of the rotor. The selsyn differential 9 has a handle wheel 10 that is calibrated in degrees to indicate the phase shift between the rotation of the generator 7 and hence engine and the rotation of the selsyn motor rotor 13.

By proper selection of the eccentric weight 15, cradle 3 can be excited with a force corresponding to any given unbalance in the workpiece. By adjustment of the hand wheel 10 the phasing of this force with respect to the rotation of the workpiece can be changed.

The shaft 6 of the drive motor 5 has a hand wheel 18 mounted thereon to provide an angular reference point on the workpiece and to allow manual positioning of the same. Therefore the unbalance simulator can electrically simulate the shifting of check weights on the rotor while the rotor is rotating.

The unbalance measuring and indicating means, the details of which form no part of this invention and which may be of any suitable form, is shown in the figure as including a vibration pickup 19 of any suitable type, which produces an output signal that varies in amplitude with the magnitude of unbalance and which varies in phase with changes in the angle of unbalance. The output signal from the vibration pickup 19 is amplified by amplifier 21 and fed into any suitable unbalance amplitude and angle detection apparatus 23.

The engine shaft has a reference signal generator such as a two phase generator that provides a pair of reference sine waves that have a fixed phase with respect to the rotation of a fixed point on the hand wheel 18 and hence on the engine shaft. The output from the reference signal generator 25 is fed into a phase shifting device such as a syncro-resolver 26 that has a hand wheel 28 operable to change the phase angle between the input signals from the generator 25 and the ouput signals connected to the unbalance angle and amplitude detection apparatus 23.

A null or angle meter 27 and an amplitude meter 29 are connected to outputs of the apparatus 23.

The unbalance amplitude and angle detection apparatus 23 may be of any type which compares the phase of the vibration signal from amplifier 21 with the phase of the reference signal from the resolver 26. When these signals ares in phase the null meter 27 indicates zero and the dial on wheel 28 can be read to determine the angular location of the unbalance on the rotor workpiece with respect to a point on the hand wheel 18. Simultaneously with a zero or null reading on the meter 27 the amplitude meter 29 will indicate the magnitude of unbalance.

A suitable unbalance amplitude and angle detection system is shown and described in S.N. 469,365, entitled "Balancing Organization," filed November 17, 1954, now Patent No. 2,947,172, in the name of William F. King and assigned to the assignee of this invention. The system shown in the King application utilizes a pair of synchronous rectifiers which provide a pair of output D.C. signals, the first of which varies in accordance with the phase relationship between the unbalance signal and a variable phase reference signal. The second D.C. signal varies in accordance with the magnitude of the unbalance signal. These D.C. signals can be used to control indicating meters such as the angle or null meter 27 which will indicate a null or in phase condition between one phase output of the resolver 26 and the amplitude meter 29 which will indicate the relative magnitude of the unbalance signal during such null condition.

The unbalance simulation system including the three selsyn components can be used to simulate any desired unbalance in the engine or other workpiece at any angle of location. By changing the value of weight 15 or the radius at which it is located on the rotor 13 of the selsyn motor 11, the amplitude of the simulated unbalance corresponding to an equivalent unbalance in the engine or workpiece can be varied. By changing the setting of wheel 10 on the differential selsyn, the angular location of the simulated unbalance can be varied without stopping rotation of the workpiece.

Thus for calibrating the detection system, a master workpiece which is either balanced within the tolerance limits or has a known unbalance is mounted in the apparatus. A check weight having a known weight is mounted on the rotor 13 of the selsyn motor 11 and the drive motor 5 is started. By varying the position of hand wheel 10 the phase relationship between the vibration imposed on the cradle 3 and the reference signal from reference generator 25 can be varied and the response of the unbalance detecting apparatus checked at all conditions of unbalance.

Similarly if a production workpiece is to be balanced within a very small tolerance, the unbalance similator can be used to add a known unbalance at any angle. By observing the amplitude meter 29, the points of maximum and minimum unbalance can be determined and the actual unbalance in the workpiece can therefore be calculated. The setting of the resolver control wheel 28 which will produce a null indication on meter 27 for the maximum reading on meter 29 will provide the angle position of the unbalance.

The polar chart method can also be used to determine the amplitude and angle of the actual unbalance as in the check weight method outlined above. However, the selsyn unbalance simulator renders the starting, stopping, and weight moving operations unnecessary.

If the unbalance simulator is to be used in an apparatus for determining dynamic unbalance in a workpiece, a second selsyn generator 31 having an eccentric weight 33 can be attached to the cradle 3 in the plane of a second pickup 35 contacting the cradle 3. By simultaneously switching, with switches not shown, the amplifier to pickup 35 and the selsyn differential 9 to selsyn motor 31 the apparatus can be used to determine the unbalance in the plane of pickup 35.

It is apparent that other unbalance amplitude and angle detection systems could be used as well as other workpiece supporting arrangements. Changes and other applications can be made without departing from the scope of the invention which is limited only by the following claims.

I claim:

1. In an unbalance determining apparatus for measuring the amplitude and angle of unbalance of a rotating body, means for supporting the body for rotation about its axis, drive means for rotating said body at a predetermined rotational frequency, means including a vibration pickup responsive to vibrations induced in said body and developing an output signal having characteristics related to the apparent magnitude and location of unbalance in said body, means for measuring the angle between the location of said apparent unbalance and the location of a reference point on said body and simultaneously measuring the amplitude of said apparent unbalance, an unbalance simulator including electrically driven means for mechanically applying a known amplitude vibration to said pickup for simulating the vibration caused by an apparent known unbalance in said body, said known vibration having a frequency equal to said predetermined rotational frequency, and electrical means for varying the angle between the location of said reference point and the location of said apparent known unbalance during rotation of said workpiece.

2. In an unbalance determining apparatus for measuring the amplitude and angle of unbalance of a rotating body, vibratile means for supporting the body for rotation about its axis, drive means for rotating said body at a predetermined rotational frequency, vibration pickup means responsive to vibrations induced in said vibratile means and developing a periodically varying unbalance signal having characteristics related to the location and magnitude of said unbalance vibrations, means driven by said drive means in synchronism with said body and producing a reference signal related to the instantaneous location of a fixed point on said body, means responsive to said reference signal and said unbalance signal for measuring the phase angle between said signals, means for indicating the maximum magnitude of said unbalance signal, an unbalance simulator including selsyn motor driven means for mechanically applying a known vibration to said vibratile means and thereby simulate a known unbalance in said body, selsyn generator means electrically connected to said selsyn motor to actuate the same and control the rotation of the same, said generator means connected to rotate in unison with said body, and means for varying the phase relationship between the selsyn motor and said selsyn generator whereby the angle between the location of said known unbalance and the location of said fixed point on said body may be varied, and means for indicating the phase angle of said relationship.

3. In an unbalance determining apparatus for determining the magnitude and location of unbalance of a rotating body, vibratile means for supporting the body for rotation about its axis, means for rotating said workpiece at a predetermined rotational frequency, means for detecting vibrations transmitted to said vibratile means from the rotating body including means for measuring the angle between the location of said unbalance and the location of a reference point on said body, an unbalance simulator including selsyn motor drive means for mechanically applying a known vibration to said vibratile means to simulate an apparent known unbalance in said body, selsyn generator means connected to rotate in unison with said body, differential selsyn means connecting said motor and said generator for varying the phase angle between the rotating frequency and said known vibration frequency whereby the angle between the location of said known apparent vibration and the location of said reference point on said body may be varied, and means for indicating said phase angle.

4. The apparatus of claim 3 wherein means are provided for measuring the magnitude of the vibrational forces received by said pickup when they are at a maximum, and means for determining when said forces are at a maximum.

5. In an apparatus for measuring the angle of unbalance of a rotating body, means for supporting the body for rotation about its axis, means for rotating said body, detecting means including a vibration pickup connected to said supporting means for detecting unbalance forces transmitted to said supporting means and producing an unbalance electrical signal having a phase and amplitude that varies with the angle and amount of unbalance force imposed on said supporting means, measuring means for indicating the angle between said unbalance signal and a fixed point on said body, said measuring means including means for providing a first reference signal indicative of the position of said body means providing a second reference signal having a controllable phase relation to said first reference signal, and means for indicating when said unbalance signal is in phase with said second reference signal, an unbalance simulator for applying a varying vibration to said support means for measurement by said detecting means, said simulator including a selsyn motor having its stator in contact with said upporting means, an eccentric weight having a predetermined mass eccentrically located on the rotor of said selsyn motor, a selsyn generator mechanically connected to rotate in unison with the body, a differential selsyn electrically connected to said selsyn generator and said selsyn motor for varying the phase angle between the generator and motor, and an angle indicator connected to said differential rotor for indicating the phase angle between said generator and motor and thereby indicating the angle between the vibration force produced by rotation of said eccentric weight and said fixed point on said body.

6. In an apparatus for measuring the angle of unbalance of a rotating workpiece having an unknown actual unbalance, means for supporting the workpiece for rotation about its axis, means for rotating said workpiece about its axis, detecting means including a vibration pickup connected to said supporting means for detecting motion of said support means caused by vibrational forces imposed thereon and producing an unbalance electrical signal having a phase and amplitude that varies with the angle and amount of said forces, means for measuring the phase angle between said signal and a reference point on said rotating workpiece, an unbalance simulator for applying a varying vibration to said support means, said simulator including a selsyn motor having its stator in contact with said supporting means, an eccentric weight rotated by the rotor of said selsyn motor, a selsyn generator mechanically connected to rotate in unison with the workpiece, and producing a signal having a fixed phase relationship to said reference point on said workpiece, a differential selsyn electrically connected to said selsyn generator and said selsyn motor for varying the phase angle between the generator and motor, and an angle indicator connected to said differential rotor for indicating the phase angle between said generator and motor and thereby indicating the phase angle between the vibration produced by rotation of said eccentric weight and said reference point on said workpiece, said unbalance signal being a maximum when the simulated unbalance vibrational force imposed on said support means by said unbalance simulator is in phase with the vibrational force imposed on said support means by rotation of said unknown actual unbalance in said workpiece, and means connected to said detection means for indicating the amplitude of said unbalance signal.

7. In an apparatus for measuring the angle of unbalance of a rotating workpiece having an unknown actual unbalance, vibratile means for supporting the workpiece for rotation about its axis, said vibratile means arranged to receive vibrations from said workpiece caused by rotation of said unknown unbalance, means for rotating said workpiece about its axis, detecting means including a vibration pickup connected to said vibratile means for detecting motion of said vibratile means caused by periodic vibrations imposed thereon, said pickup producing an unbalance electrical signal having a phase and amplitude that varies with the phase angle and amplitude of said periodic vibrations, means for providing a periodic reference signal indicative of the position of a fixed point on said workpiece, means for measuring the phase angle between said unbalance signal and said reference signal, an unbalance simulator for applying a known vibration to said vibratile means, said simulator including a motor having its stator in contact with said vibratile means, a weight having a known mass eccentrically mounted on the rotor of said motor at a known radius thereon, electrical means connected to said motor for causing the same to operate at the same speed of rotation as said workpiece for imposing a known periodic vibration on said vibratile means having the same frequency as the unknown vibration caused by said unknown actual unbalance in said workpiece, means for changing the phase relationship between said unknown periodic vibration and said known periodic vibration, said unbalance signal having a maximum amplitude when said known vibration and said unknown vibration are in phase and a minimum amplitude when said known and unknown vibrations are 180 degrees out of phase, means for measuring the magnitude of said unbalance signal at its maximum and at its minimum.

No references cited.